United States Patent
Minet-Lallemand et al.

(10) Patent No.: US 12,371,761 B2
(45) Date of Patent: Jul. 29, 2025

(54) NICKEL BASE SUPERALLOY FOR ADDITIVE MANUFACTURING

(71) Applicant: EOS GmbH Electro Optical Systems, Krailling (DE)

(72) Inventors: Kevin Minet-Lallemand, Turku (FI); Ilkka Miettunen, Turku (FI); Ville Niemelae, Turku (FI); Kristiina Kupi, Turku (FI); Abdul Shaafi Shaikh, Turku (FI)

(73) Assignee: EOS GmbH Electro Optical Systems, Krailling (DE)

( * ) Notice: Subject to any disclaimer, the term of this patent is extended or adjusted under 35 U.S.C. 154(b) by 339 days.

(21) Appl. No.: 17/918,711

(22) PCT Filed: Apr. 16, 2020

(86) PCT No.: PCT/EP2020/060652
§ 371 (c)(1),
(2) Date: Oct. 13, 2022

(87) PCT Pub. No.: WO2021/209130
PCT Pub. Date: Oct. 21, 2021

(65) Prior Publication Data
US 2023/0147621 A1    May 11, 2023

(51) Int. Cl.
| | |
|---|---|
| *C22C 1/04* | (2023.01) |
| *B22F 10/10* | (2021.01) |
| *B22F 10/28* | (2021.01) |
| *C22C 19/05* | (2006.01) |
| *C22F 1/10* | (2006.01) |
| *B33Y 10/00* | (2015.01) |
| *B33Y 70/00* | (2020.01) |

(52) U.S. Cl.
CPC ........... *C22C 1/0433* (2013.01); *B22F 10/10* (2021.01); *B22F 10/28* (2021.01); *C22C 19/055* (2013.01); *C22F 1/10* (2013.01); *B33Y 10/00* (2014.12); *B33Y 70/00* (2014.12)

(58) Field of Classification Search
CPC ............................. C22C 19/055; C22C 1/0433
See application file for complete search history.

(56) References Cited

U.S. PATENT DOCUMENTS

| | | | |
|---|---|---|---|
| 3,898,109 A | 8/1975 | Shaw | |
| 6,177,046 B1 * | 1/2001 | Simkovich | C22C 19/056 148/427 |
| 2002/0057984 A1 * | 5/2002 | Speidel | C22C 19/053 420/448 |
| 2015/0354358 A1 * | 12/2015 | Grande, III | F01D 5/286 420/448 |
| 2017/0088918 A1 * | 3/2017 | Cui | C22C 1/0433 |
| 2020/0094325 A1 | 3/2020 | Taneike et al. | |

FOREIGN PATENT DOCUMENTS

| | | |
|---|---|---|
| EP | 3034639 | 6/2016 |
| WO | 2017080659 | 5/2017 |

OTHER PUBLICATIONS

PCT Search Report and Written Opinion for Application No. PCT/EP2020/060652, dated Dec. 15, 2020, 85 pages.
Chinese Application No. 202080099818.7, Office Action dated Sep. 23, 2024.
Chinese Application No. 202080099818.7, Office Action dated Apr. 10, 2024.

* cited by examiner

*Primary Examiner* — Jessee R Roe
(74) *Attorney, Agent, or Firm* — Polsinelli PC

(57) ABSTRACT

Nickel alloys in powder form comprising at least 40 wt.-% Ni, about 20.0 to 25.0 wt.-% Cr, about 5.0 to 25.0 wt.-% Co and about 1.5 to 5.0 wt.-% Ti, which have a content of B in an amount of less than 40 ppmw, are disclosed. Corresponding alloys have the advantage of providing minimal or no micro-cracks as well as an improved ductility in creep conditions compared to similar alloys having a higher content of B, when the alloys are processed by additive manufacturing to prepare three-dimensional objects.

13 Claims, 2 Drawing Sheets

NICKEL BASE SUPERALLOY FOR ADDITIVE MANUFACTURING

TECHNICAL FIELD OF THE INVENTION

The invention concerns a specific nickel alloy in powder form comprising at least 40 wt.-% Ni, about 20.0 to 25.0 wt.-% Cr, about 5.0 to 25.0 wt.-% Co and about 1.5 to 5.0 wt.-% Ti, wherein the alloy contains less than 40 ppmw B (i.e. boron, ppmw means ppm by weight). The invention further concerns processes for the manufacture of such nickel alloy powders, processes and devices for the manufacture of three-dimensional objects, three-dimensional objects prepared by such processes and devices and the use of such a nickel alloy in powder form for minimizing and/or suppressing micro-crack formation in a three dimensional object and/or improving the creep ductility.

BACKGROUND OF THE INVENTION

A superalloy, or high-performance alloy, is an alloy that exhibits several key characteristics: excellent mechanical strength, resistance to thermal creep deformation, good surface stability, and resistance to corrosion and/or oxidation.

A particular useful superalloy, which has heretofore been employed in the aerospace and energy sector, is Inconel 939 (IN-939). This alloy was developed in the 1960s and 1970s and shows excellent oxidation resistance and high creep strength at elevated temperatures, which is thought to be caused by coherent γ'-precipitates present after solution annealing and single-step aging of the cast material. IN-939 is currently used mainly as a material for hot-gas path components in industrial gas turbines, which are typically manufactured by precision casting. Using standard manufacturing techniques, the alloy cannot be used in the "as-manufactured" condition, because the constituents thereof tend to segregate after casting and suffer from insufficient mechanical performance. Sufficient creep ductility is especially difficult to obtain, and for IN-939 was only achieved by subjecting the cast components to complex and lengthy post processing, wherein the cast component are first subjected to a solution heat treatment, followed by an aging procedure to achieve the appropriate strength and ductility levels.

A disadvantage of the preparation of components by casting is that casting is time consuming and relatively imprecise, so that cast component may have to be subjected to post-processing to bring the component into its final form. In addition, casting has limitations as to the forms which can be prepared, so that it may be necessary to cast certain parts of a component as a bulk material and to later mill the part from the bulk to its desired final form. Evidently, such processing is both slow and produces a lot of waste material.

An alternative to casting, which avoids these disadvantages, is additive manufacturing, which for components, which are fabricated from metals, is regularly accomplished by Direct Metal Laser Sintering also known as Laser-Powder Bed Fusion. With Direct Metal Laser Sintering (DMLS) e.g. net shape parts can be fabricated in a single process and complex parts can be produced directly from 3D-CAD models by layer-wise solidification of metal powder layers in portions of the layer corresponding to the cross-section of the three-dimensional part in the respective layer. This process is described in detail for example in Juha Kotila et al., Steel-based Metal Powder Blend for Direct Metal Laser Sintering Process, Advances in Powder Metallurgy & Particular Materials—1999, Vol. 2 Part 5, p. 87-93 and in T. Syvänen et al., New Innovations in Direct Metal Laser Sintering Process—A Step Forward in Rapid Prototyping and Manufacturing, Laser Materials Processing, Vol. 87, 1999, p. 68 to 76.

A method for producing a three-dimensional object by selective laser sintering or selective laser melting as well as an apparatus for carrying out this method are described, for example, in EP 1 762 122 A1.

Another recently developed process for the preparation of metal three-dimensional objects via additive manufacturing employs a binding agent, which is sprayed on distinct parts of a powder bed, layer by layer, to provide a preform of the three dimensional object. This preform is subsequently sintered while at the same time the binding agent is burned off.

A problem, which is however faced when trying to implement additive manufacturing for the fabrication of components from Nickel superalloys and IN-939 in particular, is that often micro-cracks are observed when the component is prepared which is not acceptable for sensitive parts in turbines for use in aeroplanes or power plants. Moreover, it has been observed that components fabricated from conventional IN-939 superalloy by additive manufacturing suffer from poor ductility in creep conditions.

Thus, there is a need for modified nickel alloys and in particular a modified IN-939 superalloy, which when processed by additive manufacturing, significantly alleviates or even fully supresses the formation of micro-cracks and provides components with adequate ductility in creep conditions.

The present application addresses these needs.

SUMMARY OF THE INVENTION

Accordingly, in a first aspect the present invention concerns a nickel alloy in powder form comprising at least 40 wt.-% Ni, about 20.0 to 25.0 wt.-% Cr, about 5.0 to 25.0 wt.-% Co and about 1.5 to 5.0 wt.-% Ti, wherein the alloy contains B (i.e. boron) in an amount of less than 40 ppmw. Such nickel alloys are generally described in U.S. Pat. No. 3,898,109; the improvement over this document is primarily the low content of boron.

In a preferred embodiment of this aspect, the nickel alloy in powder form comprises at least 40 wt.-% Ni, at least about 22.0 wt.-% and/or up to about 23.0 wt.-% Cr, at least about 18.0 and/or up to about 20.0 wt.-% Co and at least about 3.0 and/or up to about 4.5 wt.-% Ti, wherein the alloy contains B (i.e. boron) in an amount of less than 40 ppmw. In a more preferred embodiment of this aspect, the nickel alloy in powder form comprises at least 40 wt.-% Ni, about 22.0 to 23.0 wt.-% Cr, about 18.0 to 20.0 wt.-% Co and about 3.0 to 4.5 wt.-% Ti, wherein the alloy contains B (i.e. boron) in an amount of less than 40 ppmw. In an even more preferred embodiment, the nickel alloy in powder form comprises at least 40 wt.-% Ni, about 22.0 to 22.6 wt.-% Cr, about 18.5 to 19.4 wt.-% Co and about 3.6 to 3.8 wt.-% Ti, wherein the alloy contains B (i.e. boron) in an amount of less than 40 ppmw.

The Ni content in this alloy is preferably at least 42 wt.-%, more preferably at least 44 wt.-% and even more preferably at least 46 wt.-%. In addition, or in the alternative, the Ni content is preferably 55 wt.-% or less, more preferably 52 wt.-% or less and even more preferably 50 wt.-% or less. Most preferably, the Ni content is 48±1 wt.-% as in IN-939.

Next to the elements mentioned above, the inventive nickel alloy in powder form may comprise other elements such as in particular W, Al, Ta, Nb, Zr and carbon.

If the inventive nickel alloy contains W, the content of this element is generally at least 1.5 wt.-%, preferably at least 1.7 wt.-%, and/or up to 2.5 wt.-%, preferably up to 2.3 wt.-%. Particularly preferred inventive nickel alloys contain 2.0±0.2 wt.-% W. If the inventive nickel alloy contains Al, the content of this element is generally at least 1.5 wt.-%, preferably at least 1.7 wt.-%, and/or up to 2.5 wt.-%, preferably up to 2.3 wt.-%. Particularly preferred inventive nickel alloys contain 2.0±0.2 wt.-% Al. If the inventive nickel alloy contains Ta, the content of this element is generally at least 1.0 wt.-%, preferably at least 1.2 wt.-%, and/or up to 1.5 wt.-%, preferably up to 1.45 wt.-%. Particularly preferred inventive nickel alloys contain 1.35±0.1 wt.-% Ta. If the inventive nickel alloy contains Nb, the content of this element is generally at least 0.8 wt.-%, preferably at least 0.9 wt.-%, and/or up to 1.2 wt.-%, preferably up to 1.1 wt.-%. Particularly preferred inventive nickel alloys contain about 1.0 wt.-% Nb.

The content of Zr in the inventive nickel alloy, if present, is regularly much smaller than for the above mentioned elements. As a preferable amount of Zr, an amount of at most 0.12 wt.-% and more preferably at most 0.07 wt.-% can be mentioned. Similarly, the content of carbon (C) in the inventive nickel alloy is preferably up to 0.17 wt.-% and/or at least 0.05 wt.-% and more preferably 0.13±0.02 wt.-%.

In a particularly preferred embodiment, the inventive nickel alloy comprises W, Al, Ta, Nb, Zr and carbon in either of the more or less preferred amounts as indicated above.

As noted above, the amount of boron is critical for the inventive nickel alloy to ensure that cracking is supressed and/or sufficient creep ductility is achieved when a three dimensional object is formed from the powder, so that the amount of this element in the inventive nickel alloy is less than 40 ppmw. In a preferred embodiment, the inventive nickel alloy in powder form comprises less than or equal to 35 ppmw B, in a more preferred embodiment less than or equal to 30 ppmw B, in an even more preferred embodiment less than or equal to 20 ppmw B, in an even more preferred embodiment less than or equal to 10 ppmw B and most preferably less than or equal 8 ppmw B.

In addition, the inventive nickel alloy in powder form should not comprise non-metal elements except for those discussed above (i.e. C and B) such as N, O, P or S in amounts (of the respective element) of more than 100 ppmw. Preferably, the amount of each of N, O, P or S in the inventive nickel alloy in powder form is less than 50 ppmw and for O and S even more preferably less than 25 ppmw. The particles of the nickel alloy in powder form should conventionally have a particle size which is suitable for processing via additive manufacturing and in particular a laser sintering or laser melting process. As a suitable particle size, a particle size with a distribution d50 of from 0.1 to 500 μm, preferably at least 20 μm and/or at most 100 μm and more preferably at least 25 μm and/or at most 50 μm can be mentioned. The d50 designates the size where the amount of the particles by weight, which have a smaller diameter than the size indicated, is 50% of a sample's mass. Conventionally, as well as in the practice of the invention, the particle size distribution is determined by laser scattering or laser diffraction, e.g. according to ISO 13320:2009, e.g. with a HELOS device from Sympatec GmbH.

With regard to the above alloys it is particularly preferred that the nickel accounts for the balance to 99 wt.-% with all other metal ingredients of the respective alloy as mentioned above (i.e. at most 1 wt.-% is other undefined elements), with an amount to the balance of 99.5 wt.-% or even to the balance of 100 wt.-% being even more preferred. Alternatively, the metal alloy, which is described above with the indication "comprising" is also described herein as a metal alloy which "consists of" the indicated elements, except for unavoidable impurities.

In one preferred embodiment of the invention, the particles of the nickel alloy in powder form are substantially spherical. In another preferred embodiment, the particles of the nickel alloy in powder form are substantially irregular.

A second aspect of the present invention concerns a process for the manufacture of a three-dimensional object, which comprises providing a nickel alloy in powder form as defined above, and preparing the object by applying the nickel alloy in powder form layer on layer and selectively solidifying the alloy powder. Using this method, for example a three-dimensional object with reduced micro-cracks and/or improved ductility in creep conditions compared to the same three-dimensional object, which is prepared with a nickel alloy powder comprising ≥40 ppmw B, can be manufactured. In a preferred embodiment of the inventive process, the solidification is achieved by application of electromagnetic radiation, at positions in each layer, which correspond to the cross section of the object in this layer, wherein the positions are scanned with an interaction zone, in particular with a radiation interaction zone of an energy beam bundle. However, also contemplated are processes where a preform of the three-dimensional object is prepared by applying a binding agent to predetermined parts of a powder bed, layer by layer, and wherein the preform is subsequently solidified by sintering in an oven or similar equipment.

In the context of the above, the term "solidifying" means that the powder is consolidated from a free flowing powder to a compact body or object.

With regard to the above, it is noted that the terms "nickel alloy powder" and "nickel alloy in powder form" are used interchangeably within this specification.

The three-dimensional object may be an object of a single material (i.e. the inventive nickel alloy) or an object of different materials. If the three-dimensional object is an object of different materials, this object can be produced, for example, by applying the nickel alloy powder of the invention, for example, to a base body or pre-form of the other material.

In the process of the second aspect, the temperature may suitably be adapted. Thus, in the context of the inventive process, it may be expedient if the nickel alloy powder of the invention is heated, suitably via heating of the building platform to which the powder mixture is applied, prior to solidifying, with a heating to a temperature of at least 100° C. being preferred, preheating to a temperature of at least 130° C. being more preferred, and preheating to a temperature of at least 150° C. may be specified as still more preferred. On the other hand, preheating to very high temperatures places considerable demands on the apparatus for producing the three-dimensional objects, i.e. at least to the container in which the three-dimensional object is formed, so that as a meaningful maximum temperature for the preheating a temperature of 300° C. or less can be specified. Preferably, the maximum temperature for preheating is 250° C. or less, more preferably 220° C. or less and even more preferably 200° C. or less. The temperatures given for preheating each indicate the temperature to which the building platform to which the powder mixture is applied and by which the powder bed formed by the powder mixture is heated. In an alternative embodiment of the second aspect, the nickel alloy powder of the invention is not heated, and the process is conducted at ambient temperature (20±5° C.).

In the process of the second aspect, it has in addition been found that a heat treatment of the three dimensional object may significantly improve the physical characteristics thereof. Possibly, this effect is due to rearrangements in the microstructure in the alloy of the three dimensional object initially formed. To this end, the inventive process preferably further includes a step of subjecting the three-dimensional object initially prepared to a heat treatment, preferably at a temperature from 950° C. to 1250° C., and/or for a time of 3 to 15 h. As particularly preferred temperature range, a range of 1000° C. to 1200° C. can be mentioned. Particularly preferred time frames for the heat treatment are 3.5 to 12 h and especially at least 4 h and/or 10 h or less.

In one particular preferred embodiment the three dimensional object is subjected to a four step heat treatment at about 1160° C. for about 4 h, followed by about 6 h at about 1000° C., followed by about 24 h at about 900° C. and about 16 h at about 700° C. In another particular preferred embodiment the three dimensional object is subjected to a two step heat treatment at about 1160° C. for about 4 h followed by about 16 h at about 850° C. Preferably, after each of the heat treatment steps the three dimensional object is subjected to air cooling. For other suitable heat treatment condition, reference is made to U.S. Pat. No. 3,898,109, in particular col. 2 thereof (hereby incorporated by reference), which can suitably be employed in this invention.

For the inventive process, it is further preferred that the individual layers, which are subsequently subjected at least in part to treatment with electromagnetic radiation, are applied at a thickness of 10 μm or more, preferably 20 μm or more and more preferably 30 μm or more. Alternatively or cumulatively, the layers are applied at a thickness of preferably 100 μm or less, more preferably 80 μm or less and even more preferably 60 μm or less. In a most preferred embodiment the thickness, in which the layers are applied is in the range of 10 to 100 μm.

The process for the production of a nickel alloy in powder form according to a third aspect of the invention is a process for the production of a nickel alloy in powder form for use in the manufacture of a three-dimensional object by means of an additive manufacturing method. The nickel alloy in powder form of the present invention can be prepared by any method known to those skilled in the art of preparing powdered alloys. A particularly convenient method involves atomizing the liquid nickel alloy, wherein the nickel alloy is molten and then atomized in an appropriate device. For atomization, the nickel alloy should have a temperature of >1000° C., preferably >1200° C. and more preferably >1250° C. Temperatures of more than 1500° C. are not required for the atomization and due to the higher energy requirements less useful.

The three-dimensional object according to a fourth aspect of the invention is a three dimensional object manufactured from a nickel alloy in powder form by selective layer-wise solidification of the powder mixture by means of an electromagnetic and/or particle radiation at positions that correspond to a cross-section of the object in a respective layer, wherein the nickel alloy in powder form is as described above. The three-dimensional object may comprise or consist of the nickel alloy as described above and has, for example, reduced or no micro-cracks compared to the same three-dimensional object, which is prepared with an equivalent nickel alloy in powder form comprising 40 ppmw or more of B.

In a preferred embodiment, the three-dimensional object is a component for use in a gas turbine or aeroplane turbine.

For the three-dimensional object of the above aspect, it is preferred that it has a relative density of 98% or more, preferably 99% or more and more preferably 99.5% or more, wherein the relative density is defined as the ratio of the measured density and the theoretical density of the same alloy. The measured density is the density of the three-dimensional object as determined by the Archimedes Principle according to ISO 3369:2006. The theoretical density can e.g. be determined from a test body of the same alloy, which has been prepared by casting.

In a fifth aspect, the present invention concerns the use of a nickel alloy in powder form as described above for minimizing and/or suppressing crack formation in a three-dimensional object and/or for providing improved ductility in creep conditions of the three-dimensional object, wherein the three-dimensional object is prepared in a process involving the step- and layerwise build-up of the three dimensional by additive manufacturing. In a preferred embodiment of this use the additive manufacturing is by laser sintering or laser melting.

Finally, in a sixth aspect the present invention concerns a device for implementing a process as described above in the second aspect, wherein the device comprises a radiation source, a process chamber having an open container with a container wall, a support, which is inside the process chamber, wherein process chamber and support are moveable against each other in vertical direction, a storage container and a recoater, which is moveable in horizontal direction, and wherein the storage container is at least partially filled with a nickel alloy in powder form as described in the first aspect.

BRIEF DESCRIPTION OF THE DRAWINGS

Other features and embodiments of the invention are provided in the following description of an exemplary embodiment taking account of the appended figures.

DETAILED DESCRIPTION OF THE EMBODIMENTS

Figure 1:
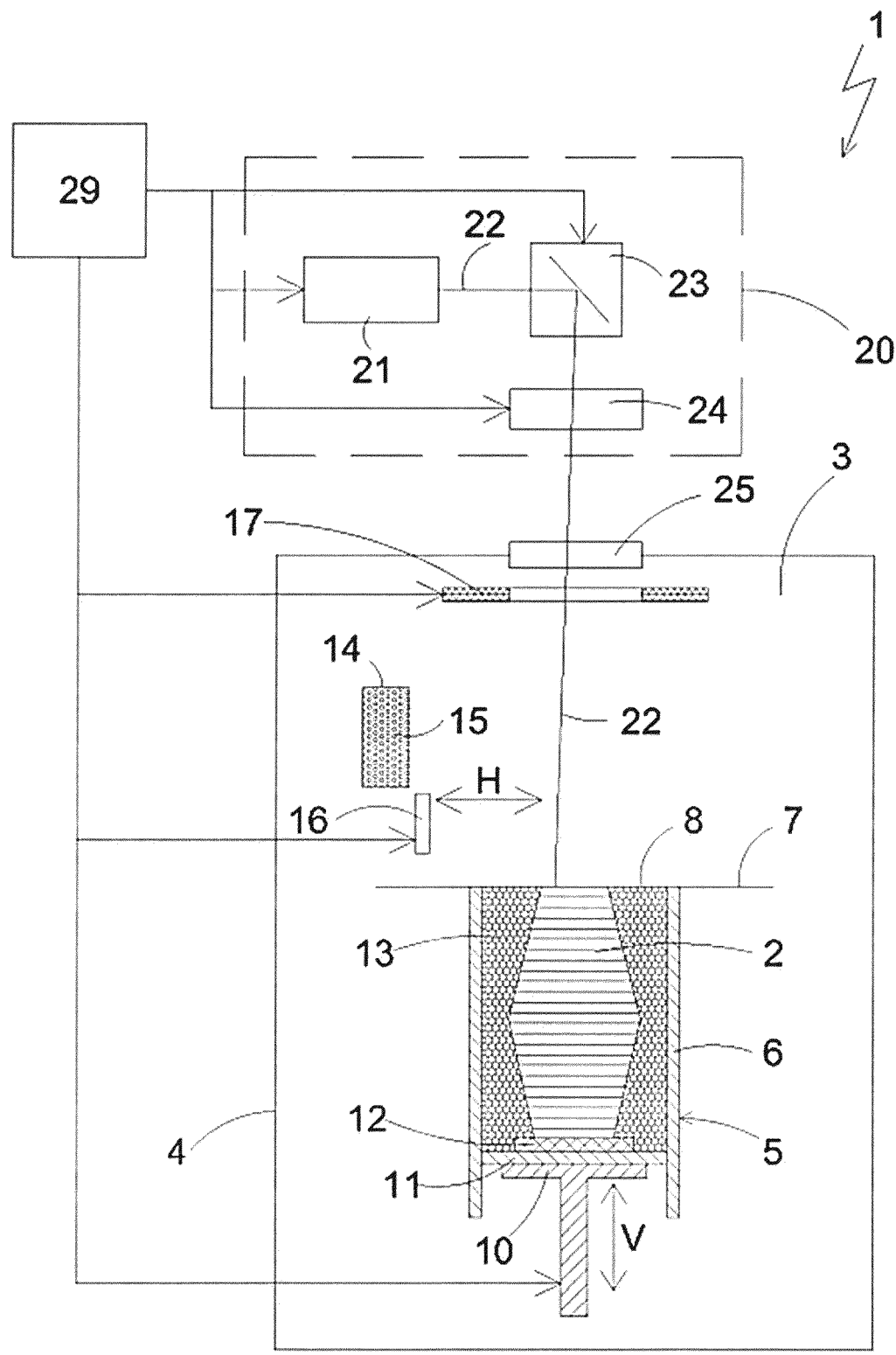
FIG. 1 is a schematic view, partially represented in section, of an exemplary device for the layer-wise manufacture of a three-dimensional object according to an embodiment of the present invention.

The device represented in FIG. 1 is a laser sintering or laser melting apparatus 1 for the manufacture of a three-dimensional object 2. The apparatus 1 contains a process chamber 3 having a chamber wall 4. A container 5 being open at the top and having a container wall 6 is arranged in the process chamber 3. The opening at the top of the container 5 defines a working plane 7. The portion of the working plane 7 lying within the opening of the container 5, which can be used for building up the object 2, is referred to as building area 8. Arranged in the container 5, there is a support 10, which can be moved in a vertical direction V, and on which a base plate 11 which closes the container 5 toward the bottom and therefore forms the base of the container 5 is attached. The base plate 11 may be a plate which is formed separately from the support 10 and is fastened on the support 10, or may be formed so as to be integral with the support 10. A building platform 12 on which the object 2 is built may also be attached to the base plate 11. However, the object 2 may also be built on the base plate 11, which then itself serves as the building platform.

In FIG. 1, the object 2 to be manufactured is shown in an intermediate state. It consists of a plurality of solidified layers and is surrounded by building material 13 which remains unsolidified. The apparatus 1 furthermore contains a storage container 14 for building material 15 in powder form, which can be solidified by electromagnetic radiation, for example a laser, and/or particle radiation, for example an electron beam. The apparatus 1 also comprises a recoater 16, which is movable in a horizontal direction H, for applying layers of building material 15 within the building area 8. Optionally, a radiation heater 17 for heating the applied building material 15, e.g. an infrared heater, may be arranged in the process chamber.

The device in FIG. 1 furthermore contains an irradiation device 20 having a laser 21, which generates a laser beam 22 that is deflected by means of a deflecting device 23 and focused onto the working plane 7 by means of a focusing device 24 via an entrance window 25, which is arranged at the top side of the process chamber 3 in the chamber wall 4.

The device in FIG. 1 furthermore contains a control unit 29, by means of which the individual component parts of the apparatus 1 are controlled in a coordinated manner for carrying out a method for the manufacture of a three-dimensional object. The control unit 29 may contain a CPU, the operation of which is controlled by a computer program (software). During operation of the apparatus 1, the following steps are repeatedly carried out: For each layer, the support 10 is lowered by a height which preferably corresponds to the desired thickness of the layer of the building material 15. The recoater 16 is moved to the storage container 14, from which it receives an amount of building material 15 that is sufficient for the application of at least one layer. The recoater 16 is then moved over the building area 8 and applies a thin layer of the building material 15 in powder form on the base plate 11 or on the building platform 12 or on a previously applied layer. The layer is applied at least across the cross-section of the object 2, preferably across the entire building area 8. Optionally, the building material 15 is heated to an operation temperature by means of at least one radiation heater 17. The cross-section of the object 2 to be manufactured is then scanned by the laser beam 22 in order to selectively solidify this area of the applied layer. These steps are carried out until the object 2 is completed. The object 2 can then be removed from the container 5.

According to the invention, a nickel alloy in powder form is used as building material 15.

According to the embodiments described below, the nickel alloy powder is processed by the direct metal laser sintering (DMLS) method. In the selective laser sintering or selective laser melting method small portions of a whole volume of powder required for manufacturing an object are heated up simultaneously to a temperature which allows a sintering and/or melting of these portions. This way of manufacturing an object can typically be characterized as a continuous and/or—on a micro-level—frequently gradual process, whereby the object is acquired through a multitude of heating cycles of small powder volumes. Solidification of these small powder portions is carried through selectively, i.e. at selected positions of a powder reservoir, which positions correspond to portions of an object to be manufactured. As in selective laser sintering or selective laser melting the process of solidification is usually carried through layer by layer, where the solidified powder in each layer is identical with a cross-section of the object that is to be built. Due to the small volume or mass of powder which is solidified in a given time span, e.g. 1 mm$^3$ per second or less, and due to conditions in a process chamber of such additive manufacturing machines, which can favour a rapid cool-down below a critical temperature, the material normally solidifies quickly after heating.

In conventional sintering and casting methods one and the same portion of building material is heated up to a required temperature at the same time. A whole portion of material required to generate an object is cast into a mould in a liquid form. This volume of building material is therefore held above a temperature level required for melting or sintering for a much longer time compared to the selective laser sintering or selective laser melting method. Large volumes of hot material lead to a low cooling rate and a slow solidification process of the building material after heating. In other words, selective laser sintering or selective laser melting methods can be differentiated from conventional sintering and casting methods by processing of smaller volumes of building material, faster heat cycles and less need for heating up build material with high tolerances for avoiding a premature solidification of the material. These can be counted among the reasons why the amount of energy introduced into the building material for reaching the required temperatures can be controlled more accurately in selective laser sintering or selective laser melting methods. These conditions allow for setting an upper limit of energy input into the powder portions to be processed, which determines a temperature generated in the powder portions, more precisely, that is lower and closer to the melting point of the respective material than in conventional sintering or casting methods.

In the following, the present invention is further illustrated by mean of examples, which however should not be construed as limiting the invention thereto in any manner.

EXAMPLE 1

Preparation of Test Bodies From A Conventional And Inventive Ni Alloy

Figure 2:
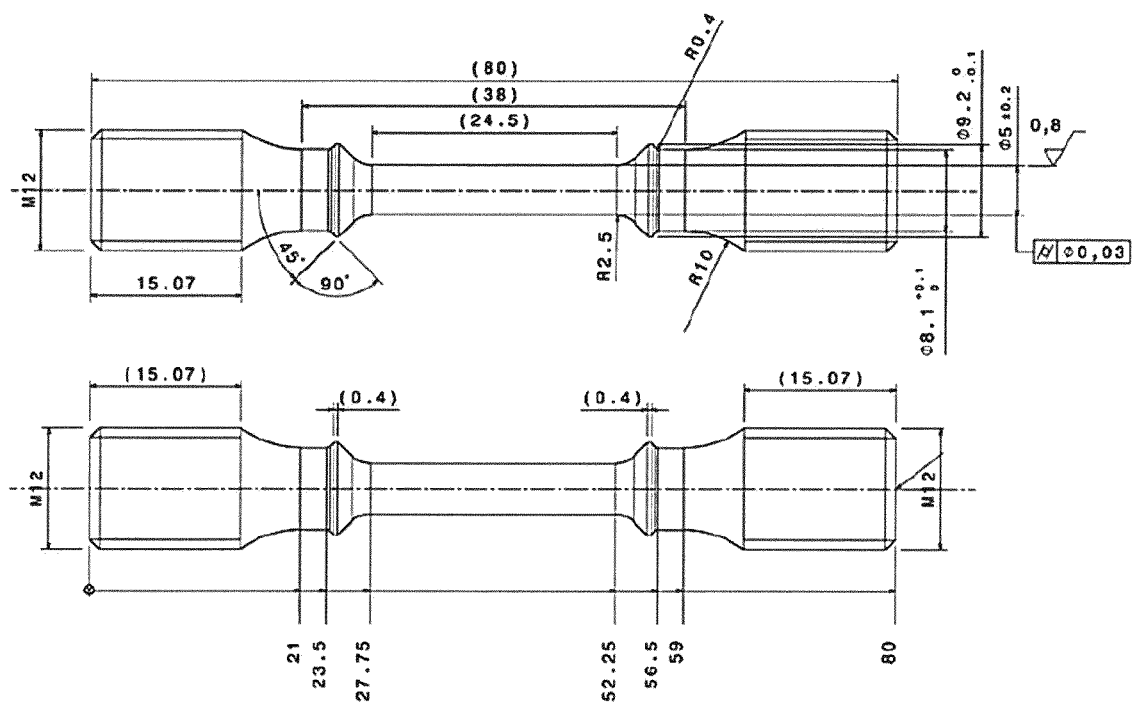
FIG. 2 is a depiction of the dimensions of test bodies prepared from an inventive and conventional IN-939 nickel alloy, which were used to determine the stress and strain characteristics of the materials

A nickel alloy with the composition Cr: 22.4 wt.-%; Co: 18.9 wt.-%; Ti: 3.7 wt.-%; W 2.0 wt.-%; Nb 1.1 wt.-%; Al 1.9 wt.-%; Ta 1.3 wt.-%, Zr 0.02 wt.-%; C 0.14 wt.-%; and B: 22 ppmw, balance Ni (inventive, sample A) and a nickel alloy with the composition Cr: 22.79 wt.-%; Co: 19.29 wt.-%; Ti: 3.8 wt.-%; W 2.17 wt.-%; Nb 0.93 wt.-%; Al 1.85 wt.-%; Ta 1.41 wt.-%, Zr 0.03 wt.-%; C 0.15 wt.-%; and B: 48 ppmw (reference, sample B) were used as the starting materials. From the materials, test bodies with the dimensions as shown in FIG. 2 were printed and heat treated at 1160° C. for 4 h, 1000° C. for 6 h, 900° C. for 24 h and finally at 700° C. for 16 h.

The thus prepared test bodies were investigated for their mechanical properties. Stress testing was performed at 816° C. using an Instron 5982 electromechanical machine equipped with a SF16 furnace and an Instron 7361C extensometer (gauge length 12.5 mm). Temperature was measured by a Type-K thermocouple attached to the specimen and kept within ±2° C. during the tests. The control mode during the testing was at constant speed of the cross head of the machine, the strain was measured with an axial extensometer up to 5% total strain when the extensometer was removed. After 5% total strain the extension of the cross-head was used for the recalculation of the strain and strain rate. For each material, three different nominal strain rates were used: $8\times10^{-3}$, $1\times10^{-5}$ and $1\times10^{-6}$ s$^{-1}$.

In this test series all samples failed before 5% elongation which means that all measured strains correspond to the strain measured by the axial extensometer attached to the samples. While the machine is controlled by a constant cross head speed, the true strain is measured by the axial extensometer. This gave some differences between the true strain rate and the intended nominal strain rate.

The results of the measurement are provided in table 1 below:

TABLE 1

| Sample ID | Diameter [mm] | strain rate [1/s] | E-modulus [GPa] | Rp0.2 [MPa] | Rm [MPa] | Elongation [%] |
|---|---|---|---|---|---|---|
| sample A#1 | 5.22 | 6.90E−03 | 135 | 697 | 834.5 | 4.9 |
| sample A#2 | 5.175 | 9.30E−06 | 140 | 394 | 481.5 | 3.4 |
| sample A#3 | 5.21 | 8.50E−07 | 85 | 300 | 379 | 2.3 |
| sample B#1 | 5.22 | 7.10E−03 | 144 | 698 | 848.5 | 4 |
| sample B#1 | 5.22 | 8.00E−06 | 95 | 402 | 471.2 | 1.9 |
| sample B#1 | 5.17 | 7.10E−07 | 100 | 330 | 368 | 1.1 |

As is apparent from the above table, the flow stress decreases with decreasing strain rate. This can be attributed to the creep effect during slow strain rate testing. Also, the elongation at fracture decreases with decreasing strain rate, which may be attributable to more accumulated creep damage during tests with lower strain rates. Finally, when comparing the samples A at comparable strain rates, the elongation at fracture is lower for the non-inventive samples B than for the inventive samples A. In micrographs of crosscuts of test bodies prepared from non-inventive samples a number of microcracks could be observed, which were not present in crosscuts of corresponding test bodies prepared from inventive samples.

On comparison of test bodies prepared from the inventive nickel alloy by additive manufacturing with test bodies which were prepared from conventional IN939 by means of casting, the performance in the stress strain behaviours was found to be comparable.

LIST OF REFERENCE SIGNS 1 laser sintering or laser meting apparatus
2 three-dimensional object
3 process chamber
4 chamber wall
5 container
6 container wall
7 working plane
8 building area
10 support
11 base plate
12 building platform
13 building material
14 storage container
15 building material
16 recoater
17 radiation heater
20 irradiation device
21 laser
22 laser beam
23 deflecting device
24 focusing device
25 entrance window
29 control unit

The invention claimed is:

1. A nickel alloy in powder form comprising:
   at least 40 wt.-% Ni;
   about 20.0 to 25.0 wt.-% Cr;
   about 5.0 to 25.0 wt.-% Co;
   about 1.5 to 5.0 wt.-% Ti; and
   B present in an amount of less than or equal to 10 ppmw,
   wherein the powder has a particle size d50 from 0.1 to 500 um as determined according to ISO 13320 by laser scattering or laser diffraction.

2. The nickel alloy in powder form according to claim 1, which comprises about 22.0 to 23.0 wt.-% Cr, about 18.0 to 20.0 wt.-% Co, and about 3.0 to 4.5 wt.-% Ti.

3. The nickel alloy in powder form according to claim 1, further comprising one or more of at least 1.5 and/or up to 2.5 wt.-% W, at least 1.5 and/or up to 2.5 wt.-% Al, at least 1.0 and/or up to 1.5 wt.-% Ta, at least 0.8 and/or up to 1.2 wt.-% Nb, and up to 0.17 wt.-% C and/or up to 0.12 wt.-% Zr.

4. The nickel alloy in powder form according to claim 1, wherein B is present in an amount of less than or equal to 8 ppmw.

5. The nickel alloy in powder form according to claim 1, comprising at least 42 and/or up to 55 wt.-% Ni.

6. A method comprising:
   providing the nickel alloy in powder form according to claim 1; and
   manufacturing a three-dimensional object in a process involving step and layerwise build-up of the three-dimensional object by additive manufacturing.

7. Process for the manufacture of a three-dimensional object, comprising providing a nickel alloy in powder form as defined in claim 1, and preparing the object by applying the nickel alloy in powder form layer on layer and selectively solidifying the alloy powder at positions in each layer, which correspond to the cross section of the object in this layer, wherein the positions are scanned with a radiation interaction zone of an energy beam bundle.

8. Device for implementing a process according to claim 7, wherein the device comprises a radiation source, a process chamber having an open container with a container wall, a support, which is inside the process chamber, wherein process chamber and support are moveable against each other in vertical direction, a storage container and a recoater, which is moveable in horizontal direction, and wherein the storage container is at least partially filled with a nickel alloy in powder form.

9. Process for the manufacture of a three-dimensional object according to claim 7, wherein the nickel alloy in powder form prior to solidifying is heated to a temperature of 100° C. or more.

10. Process for the manufacture of a three-dimensional object according to claim 7, further including a step of subjecting the three-dimensional object initially prepared to a heat treatment, and/or for a time of 3 to 15 h.

11. Process for the preparation of a nickel alloy in powder for use in a process according to claim 7, wherein the nickel alloy is atomized in an appropriate device.

12. The three-dimensional object prepared according to the process as described in claim 11, and wherein the three-dimensional object comprises or consists of the nickel alloy.

13. The three-dimensional object according to claim 12, wherein the three-dimensional object is a gas turbine component.

\* \* \* \* \*